(12) United States Patent
Palti

(10) Patent No.: US 10,495,422 B2
(45) Date of Patent: Dec. 3, 2019

(54) SYSTEM WITH A FLASHING UNIT FOR TEMPORARILY IMPAIRING VISION OF SELECTED OCCUPANTS OF AN AREA

(71) Applicant: Yoram Palti, Haifa (IL)

(72) Inventor: Yoram Palti, Haifa (IL)

(73) Assignee: LIGHTGUARD, LTD, Haifa (IL)

( * ) Notice: Subject to any disclaimer, the term of this patent is extended or adjusted under 35 U.S.C. 154(b) by 137 days.

(21) Appl. No.: 15/883,627

(22) Filed: Jan. 30, 2018

(65) Prior Publication Data

US 2018/0216919 A1    Aug. 2, 2018

Related U.S. Application Data

(60) Provisional application No. 62/452,642, filed on Jan. 31, 2017.

(51) Int. Cl.
*F41H 13/00* (2006.01)
*H05B 37/02* (2006.01)
(Continued)

(52) U.S. Cl.
CPC .......... *F41H 13/0087* (2013.01); *F21V 11/00* (2013.01); *F21V 29/70* (2015.01);
(Continued)

(58) Field of Classification Search
CPC .. F41H 13/0087; F41H 13/0043; F41H 13/00; F21V 29/70; F41A 33/02; F41A 17/08
(Continued)

(56) References Cited

U.S. PATENT DOCUMENTS 3,732,412 A * 5/1973 Tyroler .................... F21S 8/00
362/293
5,072,342 A    12/1991 Minovitch
(Continued)

FOREIGN PATENT DOCUMENTS

DE    102014014803 A1    4/2016
EP    2584490 A1    4/2013

OTHER PUBLICATIONS

International Search Report and Written Opinion for PCT/IB2018/050572 dated May 8, 2018.
(Continued)

*Primary Examiner* — Que Tan Le
(74) *Attorney, Agent, or Firm* — Potomac Law Group, PLLC (57) ABSTRACT

A system for temporarily disabling selected occupants of an area includes one or more flashing units and one or more eye protection units. Each flashing unit includes a light source that generates flashes of light sufficiently bright to temporarily disable people who see the flashes. Each eye protection unit includes a shutter that blocks light while the flashes are being generated. Each flashing unit and each eye protection unit stores data that specifies when the flashes will occur, and are synchronized with each other to ensure that the shutters are closed during each flash. A controller in each flashing unit and a controller in each eye protection unit is configured to change, at coordinated times, the data that specifies when the flashes will occur. In some embodiments, the light source comprises LEDs and the flashing units have heat sinks configured to absorb heat generated by the LEDs.

20 Claims, 11 Drawing Sheets (51) Int. Cl.
*F21V 29/70* (2015.01)
*F21V 11/00* (2015.01)
*F21S 9/02* (2006.01)
*F21Y 115/10* (2016.01)
*F41A 17/08* (2006.01)

(52) U.S. Cl.
CPC ............ *H05B 37/0281* (2013.01); *F21S 9/02* (2013.01); *F21Y 2115/10* (2016.08); *F41A 17/08* (2013.01); *Y02B 20/42* (2013.01)

(58) Field of Classification Search
USPC .............................................. 250/205, 214 R
See application file for complete search history.

(56) References Cited

U.S. PATENT DOCUMENTS

| | | |
|---|---|---|
| 5,081,542 A | 1/1992 | Efron et al. |
| 5,377,032 A | 12/1994 | Fergason et al. |
| 5,756,989 A | 5/1998 | Bear et al. |
| 6,367,943 B1 | 4/2002 | Tocci et al. |
| 6,767,108 B1 | 7/2004 | Blachowski et al. |
| 7,220,957 B2 | 5/2007 | Choi et al. |
| 8,419,213 B1 | 4/2013 | Rubtsov et al. |
| 9,519,158 B2 | 12/2016 | Brudz |

OTHER PUBLICATIONS

Texas Instruments, "TPIC6273 Power Logic Octal D-Type Latch," Jan. 1992, retrieved from the internet: https://web.archive.org/web/20150411055230if/http://www.ti.com:80/lit/ds/symlink/tpic6273.pdf, retrieved on Apr. 27, 2018.

\* cited by examiner

SYSTEM WITH A FLASHING UNIT FOR TEMPORARILY IMPAIRING VISION OF SELECTED OCCUPANTS OF AN AREA

CROSS REFERENCE TO RELATED APPLICATIONS

This Application claims the benefit of U.S. Provisional Application 62/452,642, filed Jan. 31, 2017, which is incorporated herein by reference in its entirety.

BACKGROUND

In certain situations, it may be necessary to enter an area that is held by terrorists or other adversaries to overcome them and, if necessary, to free any hostages they may be holding. The area could be a house, room, the inside of an airplane, etc. It could also involve secured areas, bank robberies, violent demonstrators, etc. These operations can be extremely dangerous, as the terrorists can be expected to open fire as soon as they see someone entering the area that they control.

U.S. Pat. No. 7,220,957 describes a prior art approach for disabling adversaries using pulses of light. The '957 patent uses a control unit that transmits trigger pulses to both a lighting subsystem and a viewer subsystem. The lighting subsystem generates a flash of light every time it receives a trigger pulse from the control unit, and the viewer subsystem closes its shutter every time it receives a trigger pulse from the control unit. But this approach has a number of drawbacks. For example, if the adversary obtains one of the viewer subsystems, the adversary can use it to protect themselves from the light pulses. Second, if the transmission of the trigger pulse from the control unit to the viewer subsystems is disturbed (e.g. due to interference or jamming) or fails to reach the viewer subsystem, the shutters will not close at the proper time, and the law enforcement personnel using the system could also be disabled by the flashes.

SUMMARY OF THE INVENTION

One aspect of the invention is directed to a system for temporarily disabling selected occupants of an area. the system comprises one or more flashing units and one or more eye protection units. Each flashing unit includes a light source configured to generate flashes of light. These flashes have an intensity that is sufficient to temporarily disable people who see the flashes. Each flashing unit also includes a driver circuit configured to drive the light source and cause the light source to generate a flash of light in response to each assertion of a first control signal. The flashing unit also includes a first controller configured to (a) store data that specifies a predetermined time sequence for activating the light source, wherein the predetermined time sequence specifies a relative time at which each of the flashes should occur, and (b) assert the first control signal at appropriate times, so as to cause the driver circuit to drive the light source at times that are specified by the predetermined time sequence.

Each eye protection unit includes a shutter that responds to a second control signal so as to block light when the second control signal is asserted and to transmit light when the second control signal is not asserted. The eye protection unit also includes a second controller configured to (a) store the data that specifies the predetermined time sequence for activating the light source, and (b) assert the second control signal at appropriate times, so as to cause the shutter to start blocking light before each flash begins, to continue blocking light until after each flash has ended, and to transmit light between the flashes.

The first controller and the second controller are synchronized in time prior to assertion of the first control signal by the first controller. This permits all the flashing units and all the eye protection units to work together as one synchronized system. Each of the first controller and the second controller is configured to change, at coordinated times, the data that is used to specify the predetermined time sequence for activating the light source.

In some embodiments of the system, synchronization in time between the first controller and the second controller is achieved using a wired connection. In some embodiments, synchronization in time between the first controller and the second controller is achieved using an RF signal. In some embodiments, synchronization in time between the first controller and the second controller is achieved using an optical signal.

In some embodiments of the system, the predetermined time sequence is non-periodic. In some embodiments, the predetermined time sequence is a pseudorandom sequence.

In some embodiments of the system, the light source comprises a plurality of LEDs. In some embodiments, the predetermined time sequence is at least 1 minute long.

In some embodiments of the system, the predetermined time sequence also specifies a duration of each flash.

In some embodiments of the system, the eye protection unit has a form-factor of a set of goggles. In some embodiments, the eye protection unit has a form-factor of a pair of eyeglasses.

In some embodiments of the system, the eye protection unit shutter comprises a liquid crystal panel.

In some embodiments of the system, the flashing unit further includes an auxiliary light source configured to generate illumination light while the second control signal is not asserted. In these embodiments, a single set of LEDs can optionally serve as both the auxiliary light source and the light source that is configured to generate the flashes of light. In these embodiments, the illumination light is generated by driving the single set of LEDs at a current that is lower than a current that is used to generate the flashes of light.

In some embodiments of the system, the flashing unit further includes a substrate and a heat sink connected to the substrate via a thermal interface material, the light source comprises a plurality of LEDs mounted to the substrate, and the heat sink is configured to absorb heat generated by the plurality of LEDs. In some of these embodiments, the heat sink has a heat capacity of at least 11,000 J. In some of these embodiments, the driver circuit comprises at least one field effect transistor, and the at least one field effect transistor is affixed to the heat sink.

Another aspect of the invention is directed to a flashing unit for temporarily disabling selected occupants of an area. The flashing unit comprises a substrate, a plurality of LEDs, a heat sink, a driver circuit, and a first controller. The plurality of LEDs is mounted to the substrate, and the plurality of LEDs is configured to generate flashes of light having an intensity that is sufficient to temporarily disable people who see the flashes. The heat sink is connected to the substrate via a thermal interface material, and the heat sink is configured to absorb heat generated by the plurality of LEDs. The driver circuit is configured to drive the plurality of LEDs and cause the plurality of LEDs to generate a flash of light in response to each assertion of a first control signal. The first controller is configured to (a) store data that specifies a predetermined time sequence for activating the plurality of LEDs, wherein the predetermined time sequence specifies a relative time at which each of the flashes should occur, and (b) assert the first control signal at appropriate times, so as to cause the driver circuit to drive the plurality of LEDs at times that are specified by the predetermined time sequence.

In some embodiments of the flashing unit, the heat sink has a heat capacity of at least 11,000 J. In some embodiments of the flashing unit, the driver circuit comprises at least one field effect transistor, and the at least one field effect transistor is affixed to the heat sink.

DETAILED DESCRIPTION OF THE PREFERRED EMBODIMENTS

Figure 1:
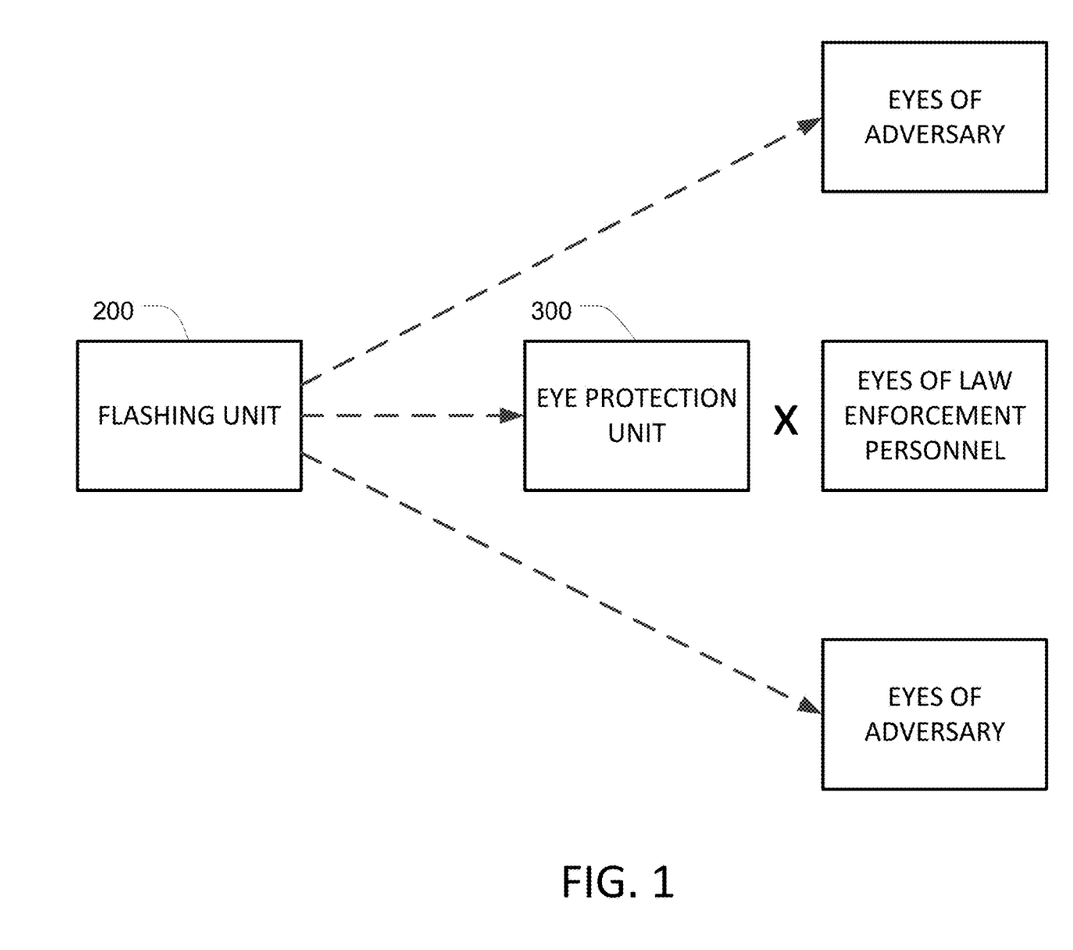
FIG. 1 is a block diagram of a secure system for temporary blinding adversaries using powerful light flashes.

FIG. 1 is a block diagram of a secure system for temporary blinding adversaries using powerful light flashes without hampering the effectiveness of the law enforcement personnel (LEP) that are sent to neutralize the adversaries. The system includes one or more light flashing units (FU) 200 and one or more eye protection units (SE) 300. These eye protection units may be implemented as switchable eyeglasses, switchable goggles, or other switchable optic units. The FU 200 and the SE 300 are synchronized so that the SE prevents the flashes of light from reaching the eyes of the LEP.

The LEP wear the SE 300 when entering the relevant area. The SE 300 have shutters that open and close in response to an internal control signal. When the shutters are open, the LEP can see through the SE normally. But when the shutters are closed, practically no light can reach the eyes of the LEP (or the sensors of alternative electro-optic (EO) devices used by LEP, such as night goggles, cameras, etc.). The FU 200 emit flashes of light that are bright enough to temporarily blind the adversaries in the area. The flashes of light are synchronized with the shutters in the SE 300 so that the flashes only occur when the shutters are closed. Thus, the LEP who are wearing the SE (and/or other EO devices) will not be affected by the flashes of light. On the other hand, all other people exposed to the flashes will be temporarily blinded.

The FUs 200 preferably emit high intensity flashes of light. Examples of suitable durations for the flashes emitted by the FUs 200 include 1 ms or less, 10 ms, or more than 20 ms. in some embodiments, the intensity of the flashes is greater than 20,000 lumen, greater than 40,000 lumen, greater than 50,000 lumen, greater than 100,000 lumen, or greater than 150,000 lumen. In some embodiments, the duty cycle of the flashes is 10%, 20%, 30%, or between 40% to 50%. In various embodiments, different values for the light emission angle may be used.

When the shutters of the SE 300 are in their light-transmitting state, they transmit at least 25% of incident light to the user's eyes. In some preferred embodiments, they transmit at least 50% of incident light. When the shutters of the SE 300 are in their light-blocking state, they transmit less than 2% of incident light to the user's eyes. In some preferred embodiments, they transmit less than 1% of incident light.

Figure 2:
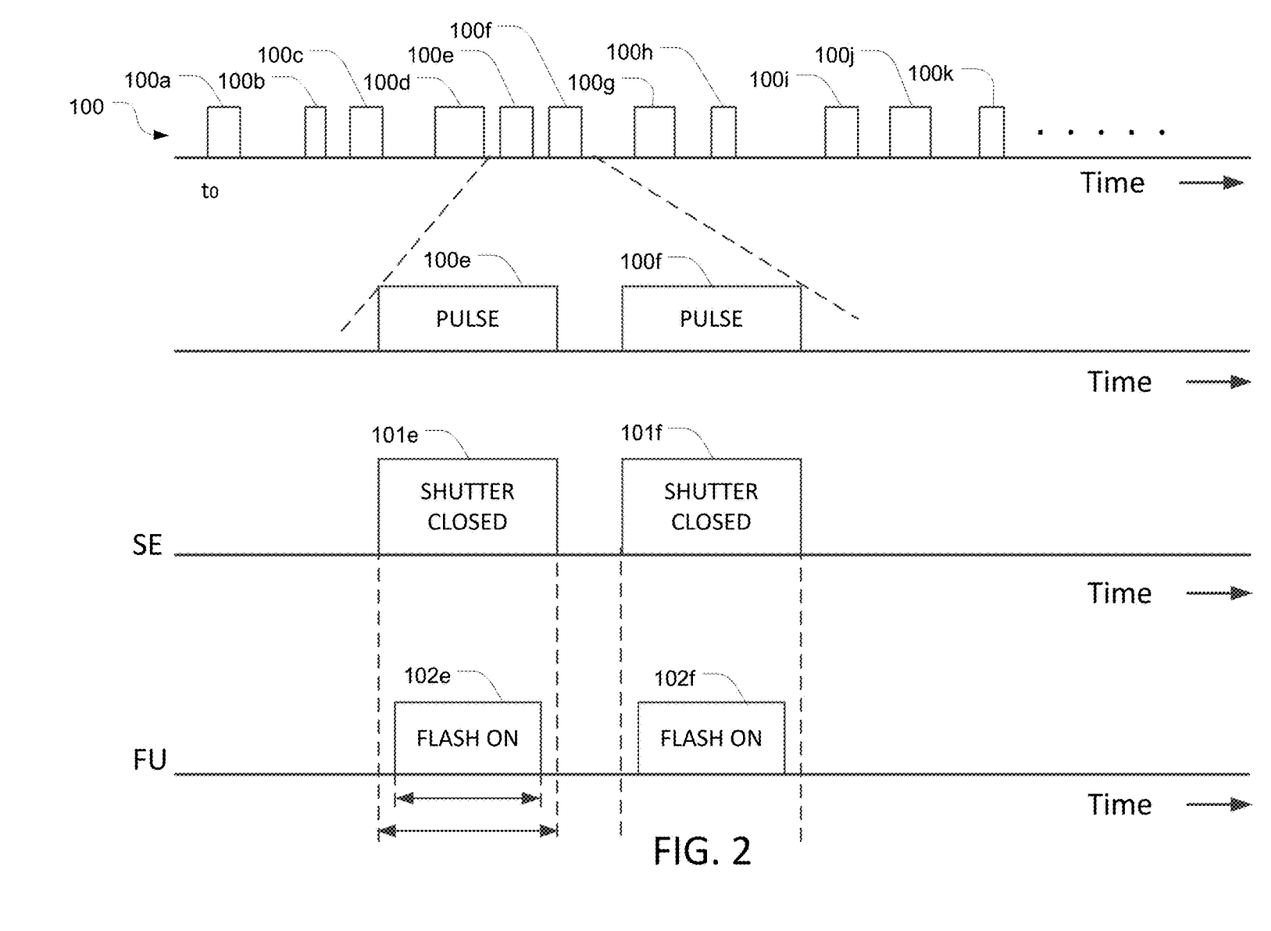
FIG. 2 depicts a confidential Pulse String that determines the times that the flashes of light appear.

Turning now to FIG. 2, the FUs 200 and the SEs 300 all have knowledge of data, also referred to herein as a confidential Pulse String (PS) 100, that specifies the relative times that the flashes of light appear. In some embodiments, both the timing of when each pulse 100a-100k in the PS 100 occurs and the duration of each pulse are encoded in the PS 100. An example of this embodiment is depicted in FIG. 2, in which shorter pulses (e.g., pulse 100b) correspond to shorter flashes and longer pulses (e.g., pulse 100d) correspond to longer flashes. In alternative embodiments (not shown), the duration of each pulse is constant, in which case only the timing of when each pulse occurs must be encoded in the pulse string. The PS 100 is preferably stored in memory in each of the FUs 200 and each of the SEs 300 using any suitable coding format. Examples include a table with an entry that specifies the start time and end time of each pulse 100a-100k of the PS 100.

The use of a confidential PS 100 prevents the adversaries from using effective countermeasures, i.e. activating their own protecting SEs 300. Optionally, the PS may be changed from time to time (e.g., once a day, prior to each use, etc.) to provide additional security. This may be accomplished, for example, by loading a new PS into each of the FUs 200 and the SEs 300 at any time before the FUs begin to flash, or by instructing each of the FUs 200 and the SEs 300 to select from one of a plurality of pre-stored PSs before the FUs begin to flash. A variety of alternative approaches in which each of the FUs 200 and the SEs 300 is configured to change the PS at coordinated times will be apparent to persons skilled in the relevant arts. Relatively long confidential pulse strings (e.g. on the order of 1 minute or more) may be used to provide improved security with respect to shorter pulse strings. Preferably, when the end of the pulse string 100 is encountered, the pulse string is re-run in a loop to provide continuous functionality.

Because each FU 200 and each SE 300 has advance knowledge of the PS 100, once the FUs and the SEs have achieved synchronization, they can both step through the same PS 100 simultaneously. More specifically, the FU 200 steps through the PS 100 to determine when to flash, and the SP 300 steps through the PS 100 to determine when to close the shutters.

The second panel of FIG. 2 depicts a magnification of two pulses 100*e* and 100*f* from the PS 100. The third panel of FIG. 2 depicts the response 101*e* and 101*f* of the SE 300 to the two pulses 100*e*, 100*f* in the PS 100. More specifically, the SE 300 will close its shutter for the full duration of each pulse in the PS 100. In contrast, the fourth panel of FIG. 2 depicts the response 102*e* and 102*f* of the FU 200 to the same two pulses 100*e*, 100*f* in the PS 100. More specifically, the FU 200 delays the onset of flashing with respect to the leading edge of each pulse 100*e*, 100*f* to give the shutters in the SE time to close, similarly, the FU 200 advances the turn-off of flashing with respect to the trailing edge of each pulse 100*e*, 100*f* to ensure that the flashing has ceased before the shutters in the SE open.

Notably, once initial synchronization has occurred, the FU 200 and the SE 300 can operate independently without requiring RF or optical communication to maintain synchronization between the FUs and the SEs.

The SE 300 is preferably switched on before the FUs 200. Prior to synchronization (e.g., using any of the synchronization approaches described herein), all the units attempt to synchronize with each other, but the FU 200 does not generate flashes of light. After synchronization is achieved, a user can activate an FU 200 using any appropriate user interface (e.g., pressing an activation switch). Additional units can join in at any time and function in synchrony with any units that are already operating if the additional units also have advance knowledge of the PS 100.

Synchronization may be implemented using any of a variety of alternative approaches including but not limited to internal synchronization and external synchronization.

In the internal synchronization embodiments, the SEs 300 and the FUs 200 are synchronized in advance prior to use (e.g., by plugging them together and implementing a suitable synchronization protocol). One example of a simple synchronization protocol is for one of the devices to generate a pulse, and have all the other devices note the exact time at which the pulse ends. In these internal synchronization embodiments, the SEs and the FUs 200 each contain a very accurate clock, and keep track of the time that has elapsed with respect to a reference event. Such clock synchronization can keep all activities sufficiently in synchrony for many hours. Of course, the duration of synchronization in these embodiments will depend on the accuracy and stability of the internal clocks.

In the external synchronization embodiments, the transmission and reception of a signal (e.g. RF, optical, audio, ultrasound, etc.) is used to synchronize the FUs 200 and the SEs 300. External synchronization may be implemented using a centralized synchronization technique in which a central unit acts as a 'Master' that transmits an initial synchronization transmission to all of the FUs and SEs. In this situation, each FU 200 and each SE 300 has a corresponding receiver that receives the synchronization transmission. Examples of transmitters/receivers that may be used for this purpose include RF transmitters/receivers, ultrasound transmitters/receivers, and optical transmitters/receivers. These transmitters/receivers may use a non-standardized protocol or a suitable standardized protocol (such as WiFi, ZigBee, Bluetooth, ULE, or GSM).

Alternatively, external synchronization may also be implemented using a decentralized synchronization technique in which one of the FUs 200 and SEs 300 transmits an initial synchronization transmission to all of the other FUs and SEs in the system. In these embodiments, each FU and each SE 300 has a receiver that receives the synchronization transmission. In either case, the specifications of the transmitter should be such so that the synchronization transmission will be able to reach the areas where the FUs will be located. All the units that receive the synchronization signal adjust their internal clock according to the synchronization signal. In some embodiments, the synchronization signal is a single pulse. In other embodiments, the synchronization pulse is a combination of a plurality pulses.

One example of a suitable approach for implementing decentralized external synchronization is to have each unit transmit its local clock. Each unit receives the transmitted clocks from all the other units. After all units have transmitted their local clock, each unit calculates the average time from all local clocks and the time difference between the unit's local clock and the average time; the local clock is then adjusted by a constant times the sign of the time difference (e.g., using a constant of 0.001, 0.01, or 0.1 second). The units are synchronized when the time difference between the local clock and the average time is smaller than the constant. Optionally, an indicator light may be illuminated to indicate that a unit is synchronized. Optionally, the synchronization protocol may be repeated periodically (e.g., every 0.1 sec, 1 sec, 5 sec. 30 sec. etc.) to make sure that all units stay in sync. Note that when a new unsynchronized unit is activated for addition to an already-operating system, its local clock will be different than the average time, however its effect on the other units will be small, and its local clock will rapidly converge to the average time. Preferably, the FU is programmed not to begin flashing until after synchronization is achieved.

In some embodiments, external synchronization may be implemented by light emissions from the FU 200. In these embodiments, each FU includes a light sensor. One of the FUs emits a pulse of light (preferably non-blinding) and the other FUs receive the light via the light sensor. Each FU may be programmed to immediately emit light after sensing the incoming light. In some embodiments, a first FU will synchronize all FUs to emit light.

In some embodiments, a first FU is randomly chosen by a collision avoidance algorithm from the set of FUs that are being deployed. An example of a suitable collision avoidance algorithm is to include an internal timer in each FU 200. Each FU will start to emit a pulse of light if any of the following criteria are met: the timer exceeds a random time or if light is sensed by the light sensing device. In this manner, a first FU will synchronize the other FUs. In some embodiments, single flashes of non-blinding light used to synchronize the FUs. In alternative embodiments, a predetermined sequence of flashes is used to synchronize the FUs.

The initial synchronization transmission may be implemented using RF signals, optical signals, ultrasound signals, etc. In some embodiments, the initial synchronization transmission may be coded to provide additional security against countermeasures. One example of a suitable coding approach for the initial synchronization transmission is to use a short sequence of pulses of different amplitudes or pulse intervals. The codes may then be interpreted by a logic unit incorporated within the SEs 300 and FUs 200 until synchronization is achieved by monitoring the timing of the signals. Optionally, the code that is used for initial synchronization transmission may be changed from time to time to provide improved security.

Once synchronization is achieved (e.g., using any of the synchronization techniques described herein), the various units (i.e., the FUs 200 and SEs 300) keep all the activities in sufficient synchrony without requiring continuous resynchronization using the transmitters and/or receivers. Preferably, the FUs 200 do not start flashing until after synchronization is achieved.

Note that, for each pulse, it is important to have the SE 300 start blocking light before the FU 200 begins flashing, and the SE must continue to block light until after the FU has finished flashing. Because the SE and the FU 200 both step through the same PS 100 in synchrony, this may be accomplished, for example, by programming the FU 200 to delay the leading edge of the flash and advance the trailing edge of the flash (as depicted in the bottom panel of FIG. 2) and/or by programming the SE 300 to advance the leading edge of the shutter closing and delay the trailing edge of the shutter closing. These differences ensure that the SEs will block the light pathways before the flash begins and open those pathways immediately after the end of the flash.

All units in the system are preferably equipped with batteries such that they can function without any external power source. Note also that all units (FUs 200, SEs 300) contain all the elements necessary for their function such that they are independent. Primary batteries and/or rechargeable batteries may be used.

Figure 3:
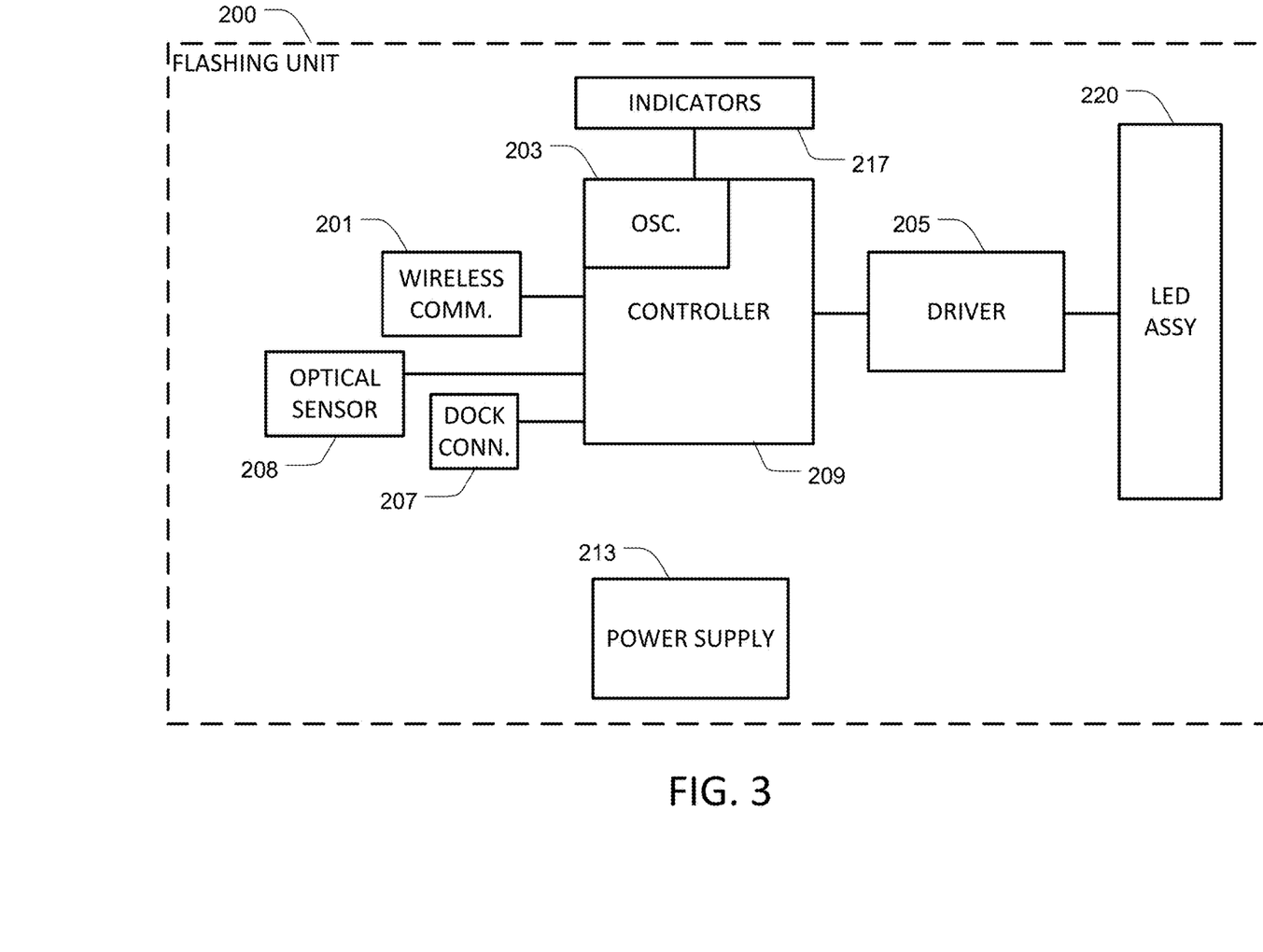
FIG. 3 is a block diagram of an embodiment of a flashing unit.

FIG. 3 is a block diagram of an embodiment of an FU 200. This embodiment includes a power supply 213 (preferably including one or more batteries), a controller 209, an LED assembly 220 (optionally including one or more optical lenses), and a LED driver 205 (e.g., comprising one or more FETs). In some embodiments, the FU 200 further includes one or more of a wireless communication unit 201, indicators 217, an oscillator 203, and a connector 207 for connecting to docking box. In some embodiments, the FU 200 further includes an optical sensor 208, which may be used for implementing external synchronization using light pulses, as described herein.

The FU 200 is controlled by the controller 209, which stores the PS 100 and activates the driver 205 to turn on the LED assembly 220 at appropriate times as described herein.

Figure 4:
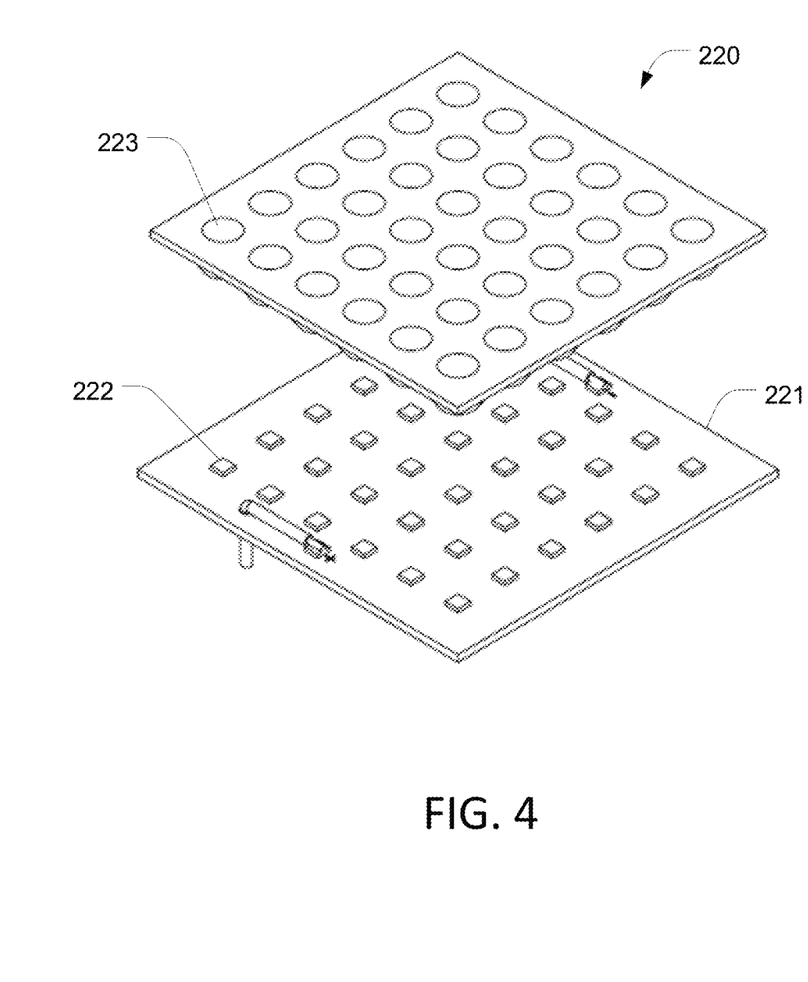
FIG. 4 is an example of a suitable LED assembly for the FIG. 3 embodiment.

One example of a suitable LED assembly 220 is depicted in FIG. 4. This assembly 220 includes a plurality of light-emitting diodes 222 mounted on a substrate 221. Optionally, a plurality of lenses 223 is disposed in front of the plurality of LEDs 222. The LEDs 222 may be connected in series and/or in parallel and activated using high currents (e.g., over 10 A, over 20 A, or over 50 A).

The FUs 200 generate very high intensity light, and may also generate a significant amount of heat that could negatively impact the performance of the FU 200. Some embodiments of the FUs 200 include thermal management components such as backings or enclosures with a high thermal conductivity and/or a high specific heat. Alternatively or additionally, a heat removing element such as a material that undergoes an endothermic phase change may be added to the FUs to prevent the LEDs from overheating.

Figure 5:
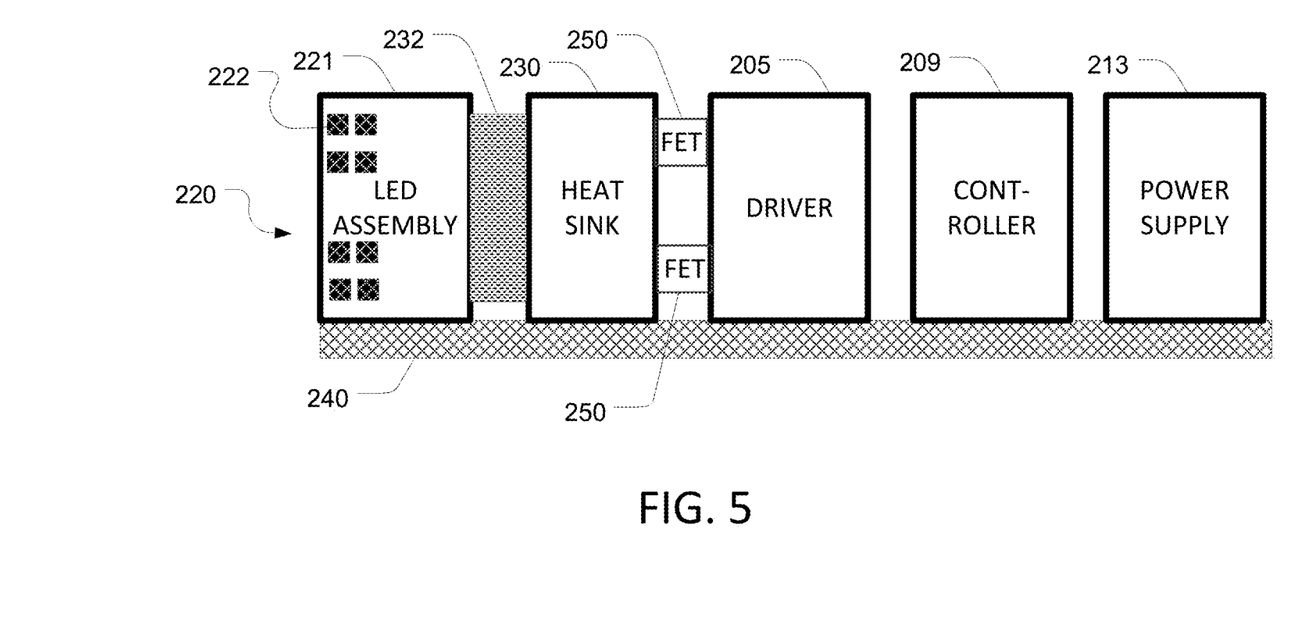
FIG. 5 is an example of the mechanical layout of the flashing unit of the FIG. 3 embodiment.

FIG. 5 is an example of the mechanical layout of the FU embodiment shown in FIG. 3 that provides thermal management for the high power used in the LED assembly 220. The LED assembly 220 in the FU 200 includes a plurality of LEDs 222 mounted on a substrate 221. The substrate 221 is connected to a heat sink 230 via a thermal interface material 232. A mechanical frame 240 supports the LED assembly 220, the heat sink 230, the power supply 213, the controller 209, and the driver 205. The heat generated by the LEDs 222 is absorbed by the heat sink 230.

The heat sink 230 is designed with a heat capacity to limit the temperature rise of the LEDs 222 during their operation. Optionally, power components within the driver 205 (e.g., FETs 250) may be attached to the heat sink 230 as well. In some embodiments, the LED assembly 220 consumes 1000 W, the duration of operation is 1 min, and the maximal temperature rise is 50° C. The required heat capacity will be at least 11 K Joule. In some embodiments, the required heat capacity may be provided by a block of Aluminum (e.g., a 200 gram block). In alternative embodiments, the required heat capacity may be provided by a phase change material embedded in a copper matrix.

The FUs 200 themselves are preferably battery-operated reusable self-contained units that can emit high intensity short flashes (duration in the range of 0.01-100 mS) at rates up to 100 flashes/sec, in synchronization with the PS 100. The light pulse repetition rate is preferably between 0.2 and 40 pulses per sec, and the pulse duration is preferably short relative to the repetition rate. In some preferred embodiments, about 10 pulses/sec are generated. In some preferred embodiments, the duration of each pulse is about 50 msec. The flashing rate is preferably selected so that the adversaries are practically blinded for the duration of the flashing. Optionally, the FUs 200 may be enclosed in a bullet proof transparent enclosure.

The FUs 200 preferably have a flash intensity that is sufficiently high to temporarily blind the adversaries without causing permanent eye damage. Both the blinding and damaging intensities are obviously a function of the light intensity, duty cycle/duration of illumination, the spectrum of the light source and the exposure time to the light. When used in certain jurisdictions, the light may be controlled so as not to exceed the relevant thresholds (e.g., European standard IEC 62471).

In some embodiments, the FUs 200 use LEDs to provide the illumination. In alternative embodiments, the FUs are similar to the ones described in U.S. Pat. No. 7,220,957 (which is incorporated herein by reference), modified to include the features described above. The FUs may be constructed using one or more flash generating units that are based on conventional xenon camera flash technology. Optionally, these conventional xenon flashes may be modified to flash light in all directions or at a specific angle.

Figure 6:
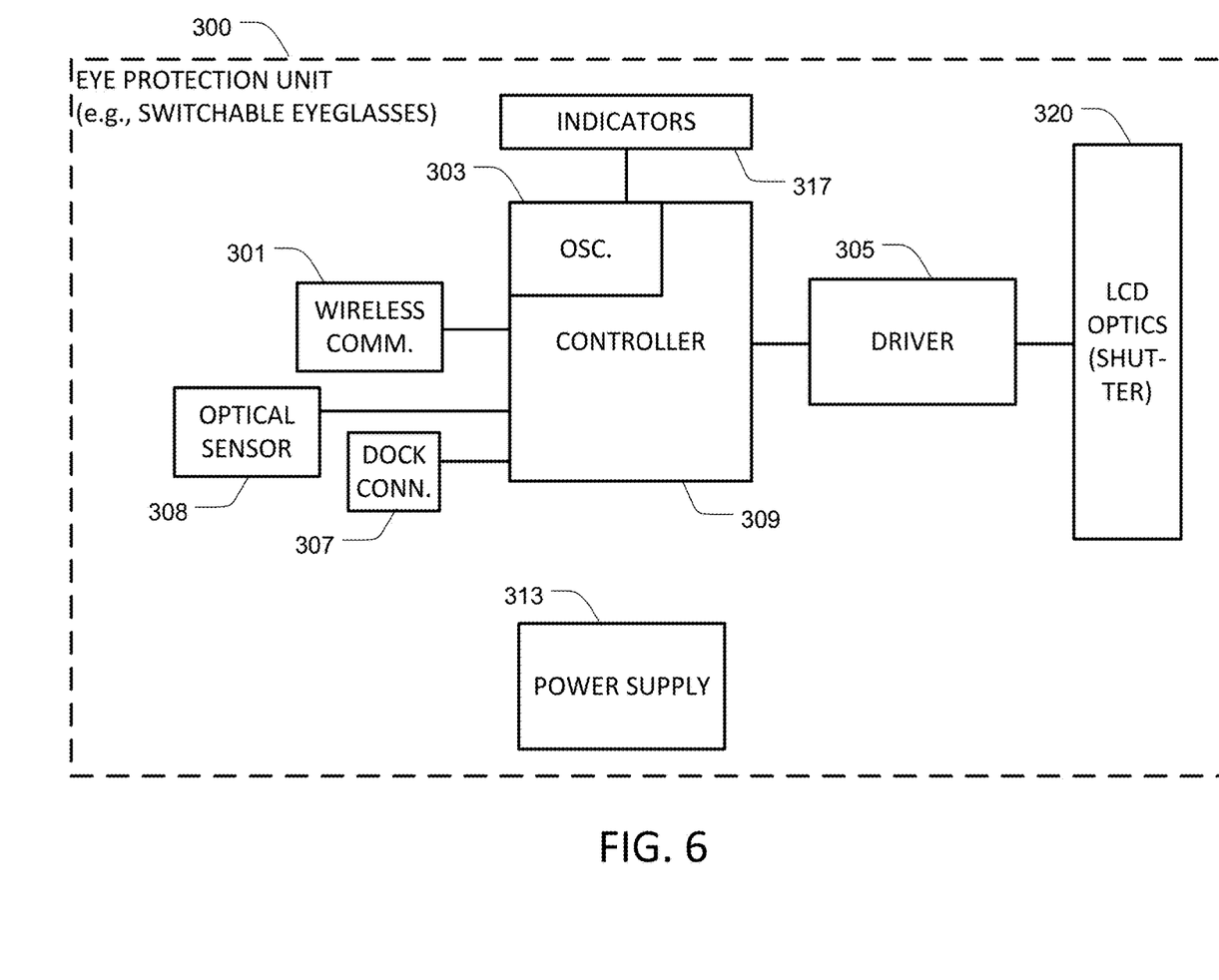
FIG. 6 is a block diagram of an embodiment of switchable eyeglasses or goggles.

FIG. 6 is a block diagram of an embodiment of an SE 300. In the illustrated embodiment, the SE 300 comprises a power supply 313 that preferably includes one or more batteries, controller 309, a shutter implemented using LCD optics 320, and a driver 305 that enables the controller 309 to switch the LCD optics 320 between the transmit and blocking states. Optionally, the SE 300 may also include wireless communication unit 301, an oscillator 303, indicators 317, and a connection to docking box 307. In some embodiments, the SE 300 further includes an optical sensor 308, which may be used for implementing external synchronization using light pulses, as described herein.

The SE 300 is controlled by the controller 309. The controller 309 stores the PS 100 and activates the driver 305 to switch the state of the LCD optics 320. For example, in some embodiments, when no voltage is applied to the LCD optics 320, the SE 300 are transparent and provides a nominal transmission (e.g., greater than 50%). When a voltage is applied to the LCD optics 320 the transmission is reduced (e.g., to less than 1%).

The SEs 300 are worn by the LEP that is due to penetrate the area controlled by the Adversaries. Preferably, when the shutters in the SEs 300 are closed, they block at least 99% of light from entering the eyes of the LEP equipped with them. The shutters can be opened or closed as determined by the state of internal electric pulses. These internal electric pulses are preferably generated in synchronization with the PS 100, as described above.

One approach for implementing the shutters is to use an LCD-based shutter similar to those described in U.S. Pat. No. 5,377,032 (which is incorporated herein by reference) that is controlled using appropriate internal control pulses, but modified so that the internal control pulses are generated after synchronization with the PS 100 as described above. Another example of a prior art LCD based shutter systems is the CrystalEyes® glasses. In alternative embodiments, mechanical shutters may be used. In either case, when the shutters are closed, the SE 300 prevents the light flashes from entering the eyes of the LEP. But when the shutters are open, the SE allow light to enter the LEP's eyes. In alternative embodiments the SE can also be equipped with low latency light sensing elements that rapidly close the shutters when the light intensity exceeds a threshold value.

The FUs 200 may be designed into different form factors that are tailored to the characteristics of the area in which they will be used. Examples include form factors that are toss-able, deployable, handheld, fixedly mounted, or mounted on a robot or drone. The thrown embodiments can be self-stabilized so as to attain a predetermined spatial position, for example, vertical orientation. The robot or drone embodiments may be autonomous and preprogrammed to deploy in a certain location, height, and angle relative to a room outline. Other examples may be mounted on an animal (e.g., a dog), in which case the animal is preferably fitted with a set of SEs 300. In other embodiments, the FU 200 can be attached by an adhesive or hook to a wall, door frame, ceiling, or floor of a designated area.

Figure 7:
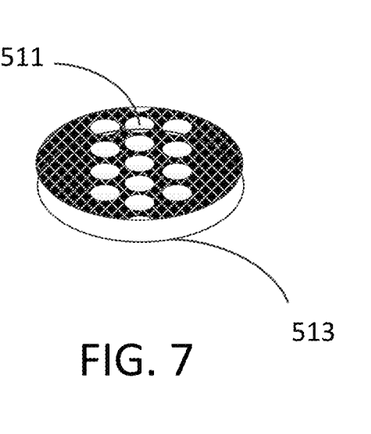
FIG. 7 is an example of a deployable flashing unit.
Figure 8:
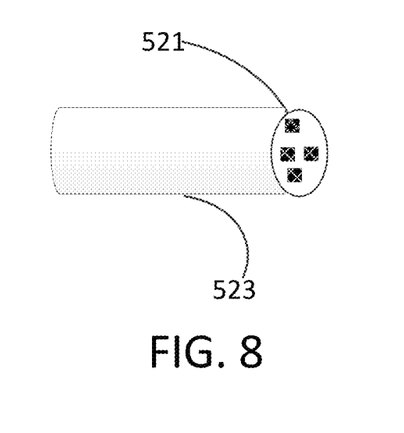
FIG. 8 is an example of a mounted directed flashing unit.
Figure 9:
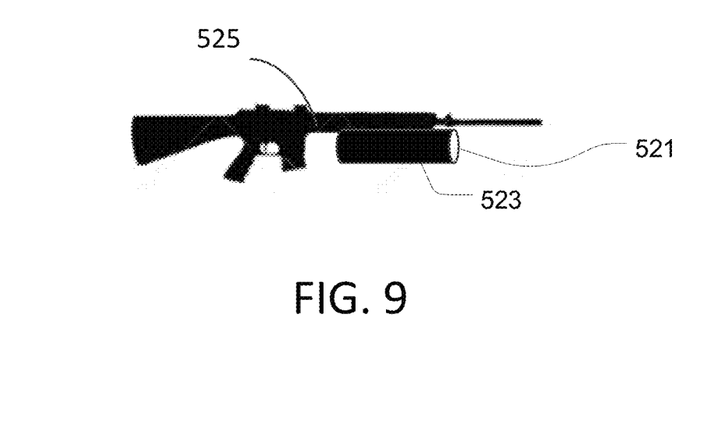
FIG. 9 is an example of the FIG. 8 embodiment mounted on a rifle.
Figure 10:
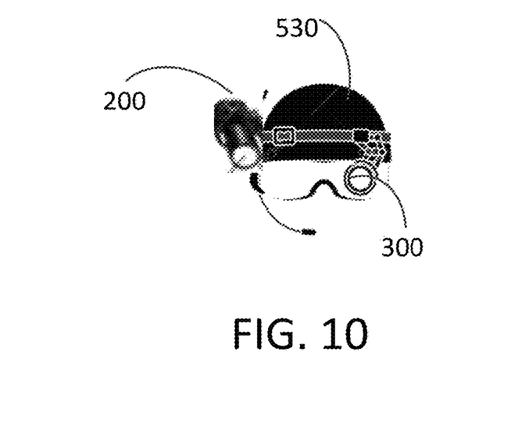
FIG. 10 is an example of a deployable directed flashing unit mounted on a helmet.

FIG. 7 is an example of a deployable FU that includes a modular light source 511 and base 513. FIG. 8 is an example of a mounted directed FU that includes a modular light source 521 and body 523. FIG. 9 is an example of the FIG. 8 embodiment mounted on a rifle 525. FIG. 10 is an example of a deployable directed FU 200 mounted on a helmet 530. Optionally, the helmet 530 may include SE goggles 300.

Figure 11:
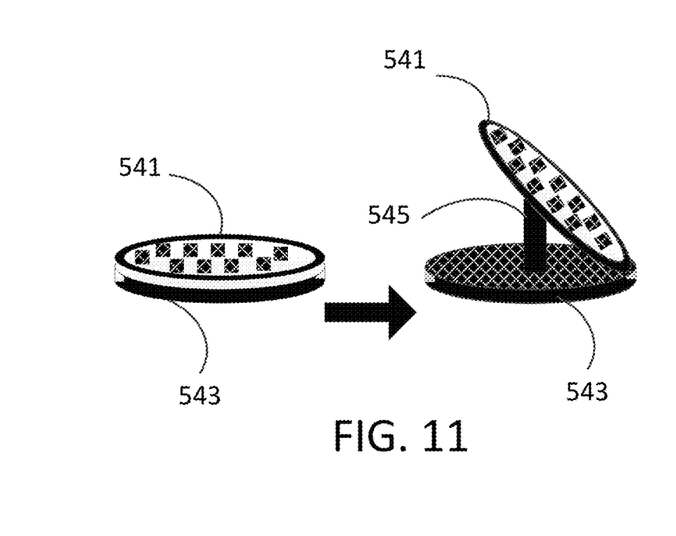
FIG. 11 is an example of a deployable directed flashing unit that includes a modular light source and an elevation pole.

FIG. 11 is an example of a deployable directed FU 200 that includes a modular light source 541; base 543; and elevation pole 545. Optionally, this embodiment may be thrown in to a target area in its initial flat configuration. After the impact of landing on the ground, the elevation pole 545 extends and elevates the modular light source 541 and base 543 to create an angle between the modular light base 543 and the ground (e.g., of 20° or more).

Figure 12:
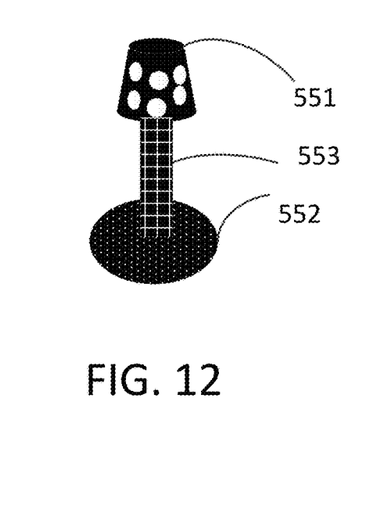
FIG. 12 is an example of another deployable directed flashing unit.

FIG. 12 is an example of a deployable directed FU that includes a modular light source 551, base 552, and elevation pole 553. Preferably, the heavier components (e.g. the batteries) are disposed in the base 552 and/or the base 552 is weighted so that the low center of gravity will keep the structure in an upright position after being thrown into the target area. Optionally, the elevation pole 553 extends after landing on the ground to elevate the modular light sources 551 (e.g., to a height of at least 0.5 m).

Figure 13:
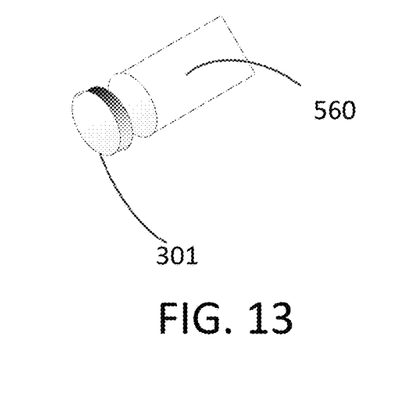
FIG. 13 is an example of an electro-optic sensor with built-in switchable shutters.

FIG. 13 is an example of an electro-optic sensor 560 with a built-in SE 301. This SE 301 is similar to the SE 300 described above, except that it is configured to fit on an electro-optic device (including but not limited to cameras, infrared cameras, etc.)

Figure 14:
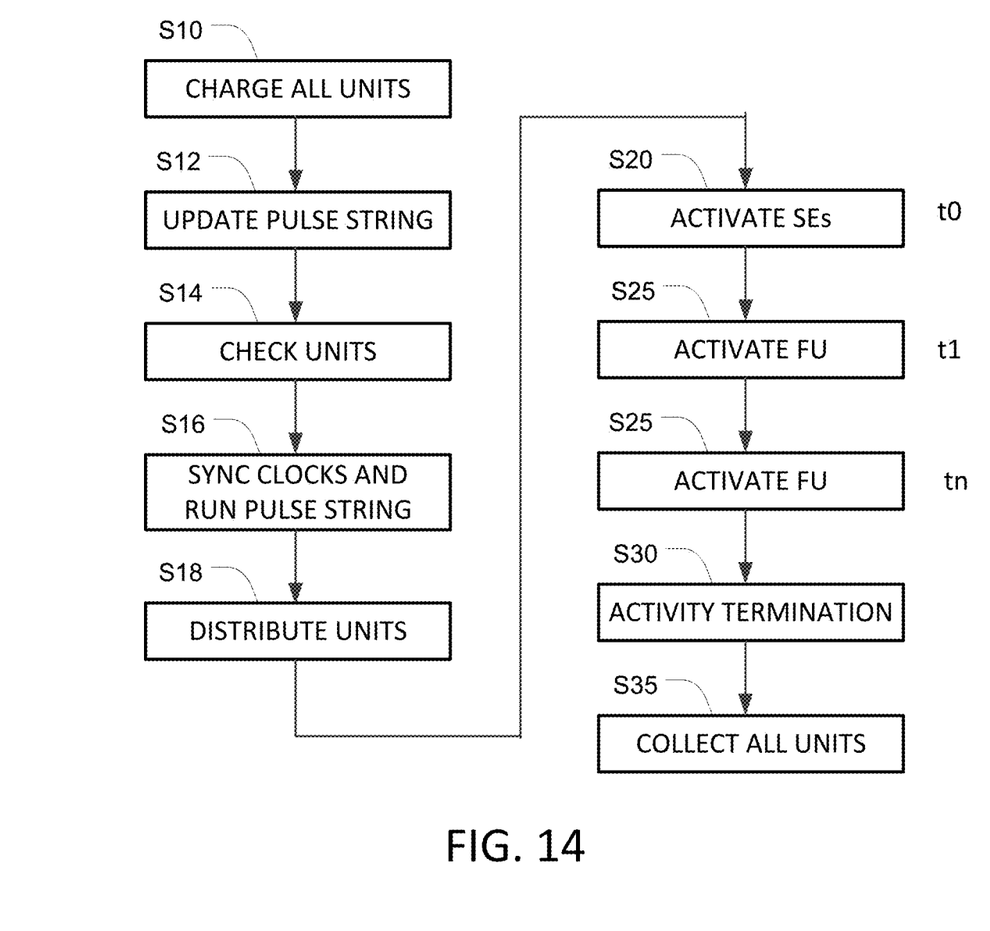
FIG. 14 depicts one example of a suitable sequence of events for using the system.

FIG. 14 depicts one example of a suitable sequence of events for using the system. In this example, all of the SEs 300 and the FUs 200 are charged in step S10. In step S12, the PS 100 is updated. In step S14, which is optional, all of the units 200/300 are checked. In step S16, the clocks in each of the units 200/300 are synchronized and begin to step through the PS. The units are then distributed in step S18. Prior to activation of the FUs 200, the FUs are inserted, thrown and self-stabilized into or carried by the LEP or other means, etc. into the areas controlled by the Adversaries, or other relevant areas. In step S20, the SEs are activated. Subsequently, in step S25, all of the FUs are activated, either sequentially or in parallel. The flashes generated by the FUs and the shutters in the SEs operate in synchrony as described above. After the LEP have completed their mission, the activity of the units 200/300 is terminated in step S30 and all the units are collected in step S35.

In some alternative embodiments, the light pulsation is initiated by the FU 200 at either an independent preset constant rate using a pre-defined sequence of flashes. In these embodiment, the FU 200 delivered (e.g., thrown, other method) into the area controlled by the adversaries. Before the LEPs enter that area, the shutters on the SE 300 are initially closed. After the LEP enters, the flashes of light are sensed by the SE. A synchronization circuit, which may optionally be built into the same enclosure as the SE, senses the light pulses using appropriate light sensor. As soon as the circuit determines the period of flashing (in the constant rate embodiments) or syncs with the PS 100 by detecting the sequence of flashes (in the pre-defined sequence embodiments), the circuit will issue commands to open the shutters at those times when flashes are not being generated, and close the shutters before the next flash in the series begins.

Figure 15:
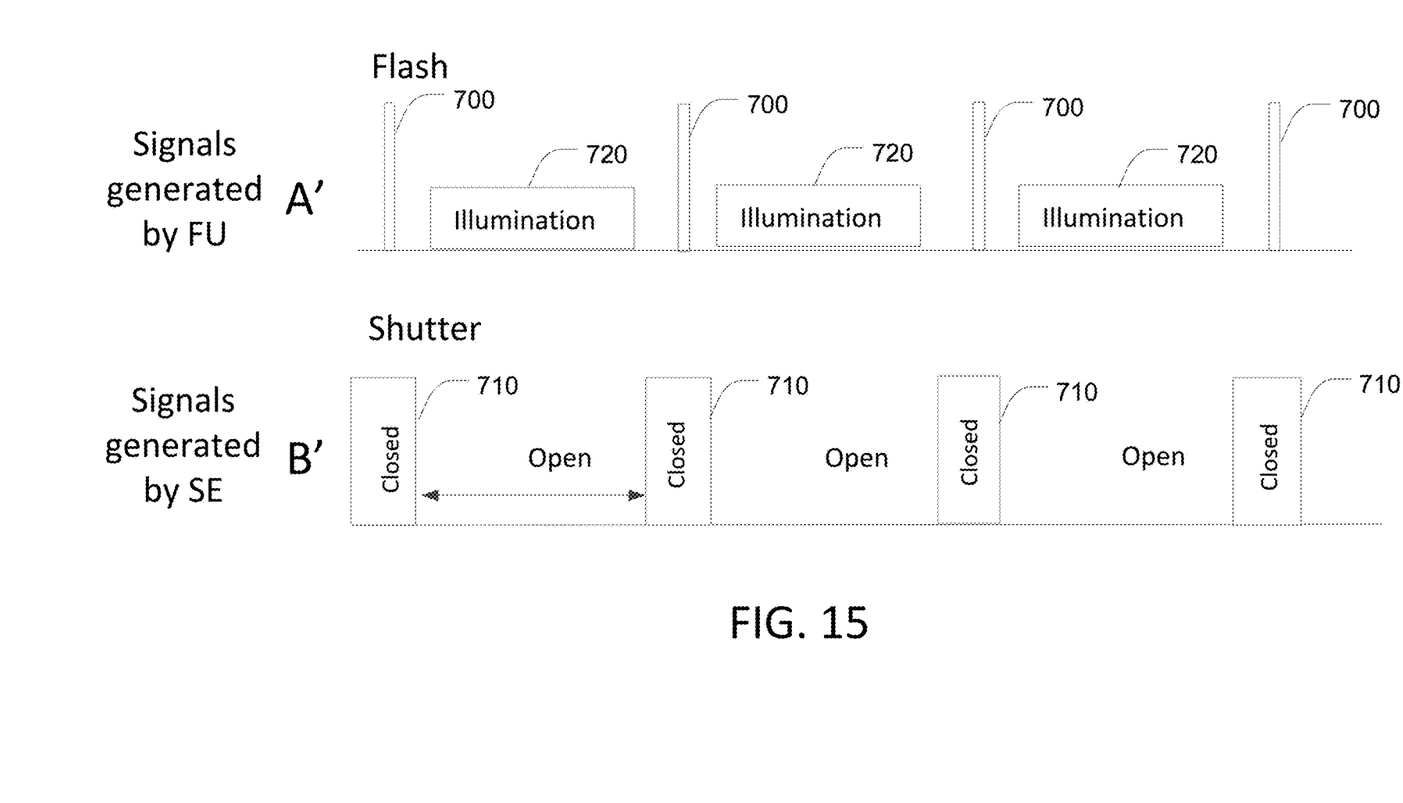
FIG. 15 depicts the timing relationship between the blinding flashes generated by the flashing unit and the shutter control signal in a supplemental illumination embodiment.

Optionally, in addition to their flash function, the FUs may be designed to provide illumination at a non-blinding intensity at times when the shutters in the SE 300 are open. This will enable the LEP to see what they are doing in dark rooms. FIG. 15 depicts the timing relationship between the blinding flashes 700 generated by the FU and the shutter control signal 710, which is identical to the relationship described above in connection with FIG. 2. However, in addition to the blinding flashes 700, the FUs in these embodiments also generate non-blinding illumination at times when the shutters of the SE are open. This may be implemented by modifying the FU described above in connection with FIGS. 2 and 3 to also provide a secondary illumination signal 720 that is activated while the shutter is open. The controller in these embodiments is configured to generate this secondary illumination signal 720, which is provided to the driver 205 (shown in FIG. 3). When the driver receives this secondary control signal, the driver will apply a much lower level of current (e.g., 1 A) to the LED assembly 220 (shown in FIG. 3), which will result in a non-blinding level of illumination.

Figure 16:
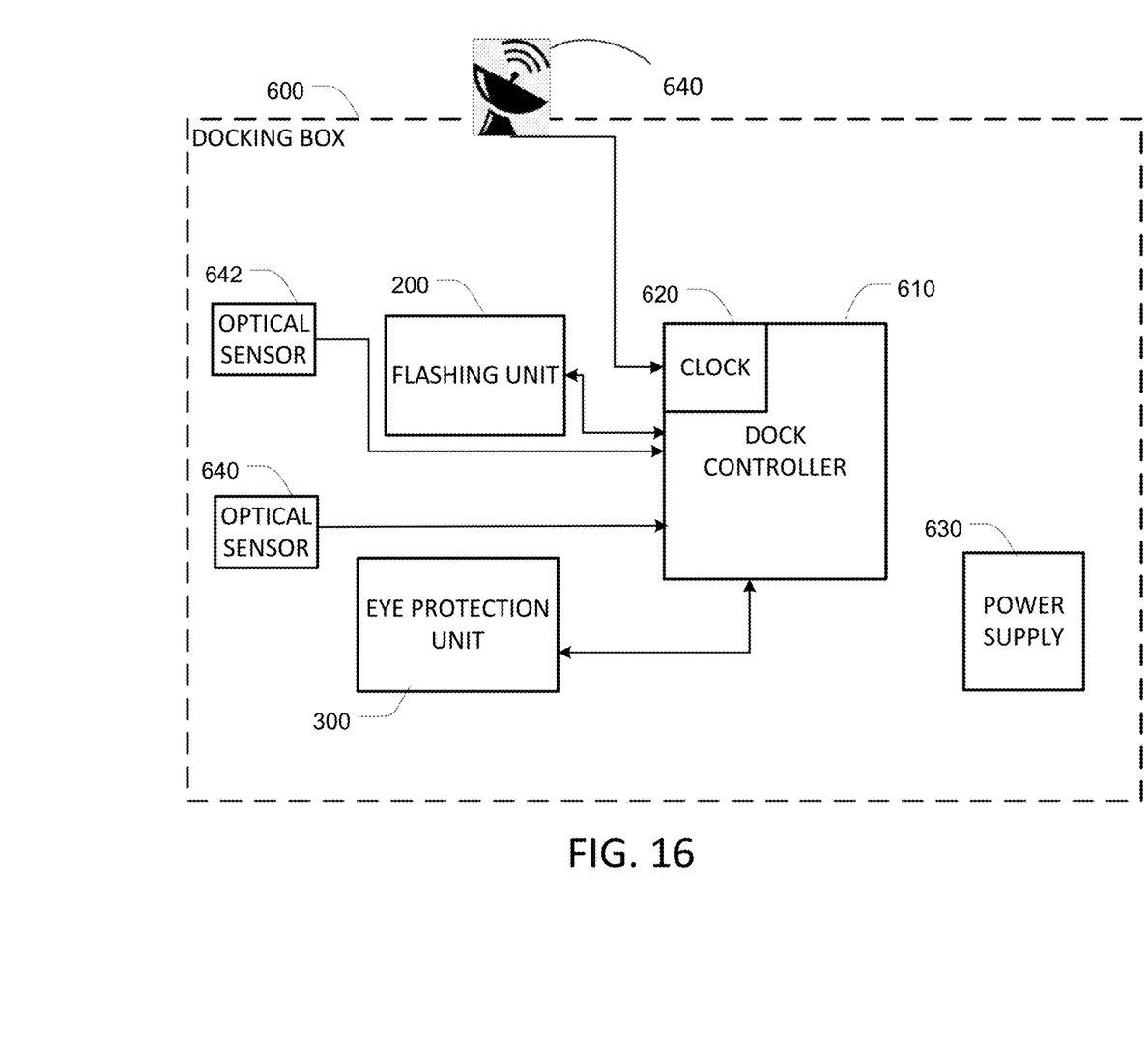
FIG. 16 is a block diagram of a docking box that may optionally be used to establish communication between the flashing unit depicted in FIG. 3 and the switchable eyeglasses or goggles depicted in FIG. 6.

FIG. 16 is an example of a docking box 600 that may optionally be used to establish communication between the FU 200 and the SE 300 so that those devices can synchronize with each other. In the illustrated embodiment, the docking box 600 includes connectors configured to interface with the SE 300 and one or more of the embodiments of the FUs 200 described above (e.g., the embodiments depicted in FIGS. 7-13). In some embodiments, the docking box 600 includes its own power supply 630, which optionally may be used to charge the FU 200 and the SE 300 that are connected to the docking box 600 via the connectors. Optionally (e.g. in the centralized synchronization embodiments), the docking box 600 may also include its own controller 610, an accurate clock 620, and optical sensors 640, 642.

In some embodiments, the docking box 600 is used to load the PS 100 into the FU 200 and the SE 300, and synchronization and communication between those devices is implemented using wired connections. These wired connections may use a custom protocol or a standardized protocol (e.g. USB, Can Bus, RS488, RS232, etc.). In alternative embodiments the docking box 600 communicates with the FU 200 and the SE 300 using RF or optical signal, which may be transmitted using a custom protocol or using a standardized protocol (e.g. Bluetooth, WiFi, and/or GSM). Optionally, a GPS receiver (not shown) may be built into the docking box 600.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A system for temporarily disabling selected occupants of an area, the system comprising:
   a flashing unit that includes
      a light source configured to generate flashes of light, wherein the flashes have an intensity that is sufficient to temporarily disable people who see the flashes,
      a driver circuit configured to drive the light source and cause the light source to generate a flash of light in response to each assertion of a first control signal, and
      a first controller configured to (a) store data that specifies a predetermined time sequence for activating the light source, wherein the predetermined time sequence specifies a relative time at which each of the flashes should occur, and (b) assert the first control signal at appropriate times, so as to cause the driver circuit to drive the light source at times that are specified by the predetermined time sequence; and
   an eye protection unit that includes
      a shutter that responds to a second control signal so as to block light when the second control signal is asserted and to transmit light when the second control signal is not asserted, and
      a second controller configured to (a) store the data that specifies the predetermined time sequence for activating the light source, and (b) assert the second control signal at appropriate times, so as to cause the shutter to start blocking light before each flash begins, to continue blocking light until after each flash has ended, and to transmit light between flashes,
   wherein the first controller and the second controller are synchronized in time prior to assertion of the first control signal by the first controller, and
   wherein each of the first controller and the second controller is configured to change, at coordinated times, the data that is used to specify the predetermined time sequence for activating the light source.

2. The system of claim 1, wherein synchronization in time between the first controller and the second controller is achieved using a wired connection.

3. The system of claim 1, wherein synchronization in time between the first controller and the second controller is achieved using an RF signal.

4. The system of claim 1, wherein synchronization in time between the first controller and the second controller is achieved using an optical signal.

5. The system of claim 1, wherein the predetermined time sequence is non-periodic.

6. The system of claim 1, wherein the predetermined time sequence is a pseudorandom sequence.

7. The system of claim 1, wherein the light source comprises a plurality of LEDs.

8. The system of claim 1, wherein the predetermined time sequence is at least 1 minute long.

9. The system of claim 1, wherein the predetermined time sequence also specifies a duration of each flash.

10. The system of claim 1, wherein the eye protection unit has a form-factor of a set of goggles.

11. The system of claim 1, wherein the eye protection unit has a form-factor of a pair of eyeglasses.

12. The system of claim 1, wherein the shutter comprises a liquid crystal panel.

13. The system of claim 1, wherein the flashing unit further includes an auxiliary light source configured to generate illumination light while the second control signal is not asserted.

14. The system of claim 13, wherein a single set of LEDs serves as both the auxiliary light source and the light source that is configured to generate the flashes of light, and wherein the illumination light is generated by driving the single set of LEDs at a current that is lower than a current that is used to generate the flashes of light.

15. The system of claim 1, wherein the flashing unit further includes a substrate and a heat sink connected to the substrate via a thermal interface material, wherein the light source comprises a plurality of LEDs mounted to the substrate, and wherein the heat sink is configured to absorb heat generated by the plurality of LEDs.

16. The system of claim 15, wherein the heat sink has a heat capacity of at least 11,000 J.

17. The system of claim 15, wherein the driver circuit comprises at least one field effect transistor, and wherein the at least one field effect transistor is affixed to the heat sink.

18. A flashing unit for temporarily disabling selected occupants of an area, the flashing unit comprising:
   a substrate;
   a plurality of LEDs mounted to the substrate, wherein the plurality of LEDs is configured to generate flashes of light having an intensity that is sufficient to temporarily disable people who see the flashes;
   a heat sink connected to the substrate via a thermal interface material, wherein the heat sink is configured to absorb heat generated by the plurality of LEDs;
   a driver circuit configured to drive the plurality of LEDs and cause the plurality of LEDs to generate a flash of light in response to each assertion of a first control signal; and
   a first controller configured to (a) store data that specifies a predetermined time sequence for activating the plurality of LEDs, wherein the predetermined time sequence specifies a relative time at which each of the flashes should occur, and (b) assert the first control signal at appropriate times, so as to cause the driver circuit to drive the plurality of LEDs at times that are specified by the predetermined time sequence.

19. The flashing unit of claim 18, wherein the heat sink has a heat capacity of at least 11,000 J.

20. The flashing unit of claim 18, wherein the driver circuit comprises at least one field effect transistor, and wherein the at least one field effect transistor is affixed to the heat sink.

* * * * *